United States Patent [19]

Schoonman

[11] 4,034,079

[45] July 5, 1977

[54] SELF-SANITIZING PLASTIC

[76] Inventor: Marten Leonard Schoonman, 906 N. Elam Ave., Greensboro, N.C. 27408

[22] Filed: Nov. 24, 1975

[21] Appl. No.: 634,381

Related U.S. Application Data

[63] Continuation of Ser. No. 441,775, Feb. 12, 1974, abandoned.

[52] U.S. Cl. .................................. 424/83; 424/78; 424/148; 424/154
[51] Int. Cl.² ....................................... A61K 31/745
[58] Field of Search ............... 424/148, 154, 78, 83

[56] References Cited

UNITED STATES PATENTS

| | | | |
|---|---|---|---|
| 117,671 | 8/1871 | Oldberg | 424/154 |
| 3,705,235 | 12/1972 | McIntosh et al. | 424/83 |

OTHER PUBLICATIONS

Chemical Abstracts 54:2497e (1960).
Chemical Abstracts 61:6871g (1964).
Chemical Abstracts 54:17882h (1960).
Encyclopedia of Polymer Science & Tech., vol. 2, p. 568 (1964).

*Primary Examiner*—Leonard Schenkman
*Attorney, Agent, or Firm*—Sughrue, Rothwell, Mion, Zinn & Macpeak

[57] ABSTRACT

Self-sanitizing plastic containing boric acid and ammonium alum or potassium alum in synergistic combination. Preferably, finely-divided inert particles, such as pigment particles, are also contained in the self-sanitizing plastic.

8 Claims, No Drawings

SELF-SANITIZING PLASTIC

BACKGROUND OF THE INVENTION

This is a continuation of application Ser. No. 441,775, filed Feb. 12, 1974, now abandoned.

The present invention relates to self-sanitizing plastic articles.

More particularly, the present invention relates to methods of producing self-sanitizing plastic articles, synergistic additives to be incorporated into plastics to impart self-sanitizing properties thereto, and self-sanitizing plastics containing the additives in synergistic amounts, with or without the further addition of finely-divided inert particles.

Today, plastic articles (whether thermoplastic or thermosetting plastics are employed) are finding increasing use for purposes requiring germicidal properties or for purposes where germicidal properties would be highly desirable. For example, plastic materials are used in the manufacture of disposable hospital kits of many types, receptacle liners, bedding, examination equipment, i.e., for a doctor, dentist, etc., building supplies, food handling equipment and the like. In certain instances, such as disposable hospital kits, for example drainage bags, irrigation solution bags and tubing, and the like, antisepsis is essential while at other times, for example with crib bedding, bathroom accessories, telephone caps, particularly for the ear piece, and the like, germicidal properties would be highly useful and desirable.

The problems presented in devising self-sanitizing plastics are many. First of all, germicidal agents are necessary which are characterized by retention of activity over extended periods for non-disposable articles, which will exhibit continued germicidal activity on the surface of an article whether or not the article is gradually worn away, which do not pose environmental contamination problems with respect to incorporation in disposable articles, which are non-irritating to human skin and membranes, and the like. Second, the germicidal agents must be adaptable for use in a variety of plastic article-forming operations which often utilize high temperatures and high pressures. In other words, the germicide must be able to withstand temperature at least as high as the melting points of common plastic resins and be able to withstand the pressures of the order commonly used in plastic molding operations, such as in extrusion procedures, compression molding operations, etc.

In the past, special chemicals and chemical combinations have been suggested for use in the production of self-sanitizing plastics. For example, U.S. Pat. No. 3,705,235 by McIntosh et al. is directed to the use of nonionic trialkyl amines and optionally one of a Group II-A or Group II-B (of the periodic table) metal salt of a monocarboxylic acid having a carbon chain length of 1 to 4, cadmium chloride or ethylenediaminetetraacetic acid as a sanitizing additive for plastic articles. However, the trialkylamines, such as lauryl dimethylamine (available as Barlene 12S from Lonza Inc., of Fairlawn, N.J., and Mapleton, Ill.) are strong skin irritants, toxic if swallowed, corrosive and difficult to handle during manufacturing operations and emit dangerous levels during molding procedures. Further, self-sanitizing plastics containing the trialkylamines do not retain their germicidal properties following repeated washing. Additionally, hexachlorophene has been found to be dangerous when repeatedly used by humans.

In addition to prior art directed to the employment of specific sanitizing agents it is known that the presence of finely-divided inert particles uniformly disposed throughout a plastic article accentuates in some manner the continued, gradual migration of other matter included in the plastic to the surface of the plastic.

Therefore, it is an object of this invention to provide self-sanitizing plastic materials.

Another object of this invention is to provide self-sanitizing plastic articles characterized by sustained germicidal activity over extended periods of time.

A further object of this invention is to provide self-sanitizing plastics exhibiting germicidal activity against a wide spectrum of pathogens.

Another object of the present invention is the provision of a self-sanitizing plastic material which may be used by human beings with no toxic or irritating effects.

Another object of the present invention is the provision of a self-sanitizing and non-toxic plastic material which may be prepared into a number of physical shapes using conventional construction techniques.

Another object of the present invention is to provide a sanitizing additive which may be formulated with thermoplastic materials and will not degrade or otherwise reduce the physical properties of the plastic material during fusion of the plastic material and subsequent use thereof.

These and other objects, features and advantages of the present invention will become apparent from a review of the following detailed description.

SUMMARY OF THE INVENTION

It has now been found that a plastic article containing 0.5 to 10 percent boric acid and 0.5 to 10 percent ammomium alum or potassium alum (weight to weight) uniformly dispersed therethrough is characterized by self-sanitizing properties against many of the common pathogens and other organisms which cause sanitary problems, such as mildew producing organisms. Preferably, boric acid is present in 2 to 5 percent and the alum is present in 2 to 5 percent, based on the weight of the plastic article, and a finely-divided inert particulate is also found uniformly dispersed throughout the plastic article. Most preferably, about 2½ to 4 percent boric acid, about 2½ to 4 percent alum and about 1 to 3 percent of the particulate are contained within the plastic. The alum of choice is ammonium alum, potassium alum being less heat tolerable.

The self-sanitizing plastic is made by uniformly dispersing the boric acid and alum, and preferably the particulate, throughout molten plastic and molding the mixture. Molding may directly form the end product, such as an extruded fiber, or an intermediate plastic form such as a sheet or block may be molded to be re-melted and formed into the final product.

DETAILED DESCRIPTION OF THE INVENTION

The present invention provides a self-sanitizing plastic useable in the manufacture of a wide range of manufactured goods. As far as applicant is aware, the self-sanitizing plastic of the present invention can be used for any purpose where a self-sanitizing effect is desired. Although a complete listing of end use plastic articles is impossible, it is envisioned that the self-sanitizing plastic of this invention would be used in at least the following articles, which listing is presented as exemplary only: mattress covers, crib covers, bassinet covers, draw sheets, cubicle curtains, pillow covers, emesis basins, toilet seats, shower curtains, male and female urinals, bed pans, bed pan liners, wash basins, carafes, toothbrushes, hair brushes, combs, soap holders, denture cups, rolls of utility sheeting, catheters, drainage bags, colostomy pouches, ileostomy pouches, IV solution bags, irrigation solution bags, blood bags, tubing, administration sets, donor sets, fountain syringes, enema bags, contact lens holders, examination equipment covers for all classes of trade including a medical doctor, veterinarian, dentist, optometrist, ophthalmologist, and optician, moisture barrier for building trade to eliminate mold and mildew, table tops, food handling trays, wall paneling, floor covering, carpet base, bath mats and telephone caps for mouth piece and reception unit.

The self-sanitizing plastic of this invention, as far as is known, may be formed of any thermoplastic or thermosetting plastic. The only limitation is a practical consideration, namely, that the plastic product is formed in a manner by which the antiseptic properties of the sanitizing additive are not deleteriously affected and the sanitizing additive does not interact with the resin or precursor thereof to deleteriously affect the properties of the plastic without sanitizing additive.

As non-limiting examples of plastics, there may be mentioned polyolefins such as polyethylene, polypropylene, polybutene, poly 1-methylpentene, etc.; polyesters such as polyethylene terephthalate, polyamides such as poly(hexamethylene adipamide), polycaprolactam, etc.; polyformaldehydes such as the polyoxymethylenes, resins of formaldehyde-urea condensates, the melamine resins, synthetic rubbers, the polyvinyl resins such as polyvinylchloride and polyvinylidene chloride, and the like. Of course, the resin may be a homopolymer, a copolymer of two or more monomers, a blend of two or more polymers, etc.

The self-sanitizing plastic of this invention has the capacity to kill many types of bacteria, i.e., streptococci; fungi and other disease-producing, mold-producing and infection-producing micro-organisms which might come into contact with the surface of a molded object prepared from the material. Many such micro-organisms are, for example, those which commonly cause communicable diseases, and in general the self-sanitizing plastic is fatal to many organisms which are classified bacteriologically as Gram-positive or Gram-negative.

The plastic material of this invention has the further ability to maintain its efficacy after repeated washings, such as would be commonly employed in many applications. The longevity is measured in a period of time which generally outlasts the life of most applied usages of the plastic.

As discussed above, the synergistic sanitizing additive is present in the plastic article in a concentration of 0.5 to 10 percent for boric acid and 0.5 to 10 percent for alum, preferably 2 to 5 percent for boric acid and 2 to 5 percent for alum. Also, in preferred embodiments 0.5 to 3 percent by weight, say 1 to 3 percent of the inert, finely divided particulate is also present. Most preferably, the plastic will contain about 2½ to 4 percent of boric acid, about 2½ to 4 percent of the alum and the particulate.

The chemical structure of boric acid is $H_3BO_3$. A relatively pure grade should be employed such as pharmaceutical quality where contact with skin or membranes is contemplated.

As discussed above, the alum is selected from ammonium alum and potassium alum. Again, pharmaceutical grades should be employed where contact with skin or membrane is contemplated.

The structural formula for ammonium alum is: $(NH_4)_2SO_4.Al_2(SO_4)_3$, sometimes written as $NH_4(SO_4)_2Al.12H_2O$.

The structural formula for potassium alum is: $K_2SO_4 . Al_2(SO_4)_3 . 24H_2O$, sometimes written as $KAl(SO_4)_2 . 12H_2O$.

Further, exsiccated alum (burnt alum) is usable.

The alum of choice is ammonium alum because it has been found to be more stable during the high temperatures and pressure conditions used during plastic article molding operations, such as film and fiber extrusion.

The finely-divided inert particulate can be selected from any of the finely-divided materials normally found in combination with the specific plastic under consideration, for example, fillers, extenders, pigments, etc. As non-limiting examples there may be mentioned magnesium carbonate, calcium carbonate, magnesium oxide, titanium doixide, carbon black, zinc oxide, barium sulfate, lithopone (barium sulfate-zince sulfate combination), organic lakes and toners, calcium sulfate, magnesium silicate, antimony oxide, chrome yellow, chrome orange, cadmium yellow, etc. The particular size of the finely-divided material will be the same as that normally used in plastic molding operations, generally about 2 microns.

It is believed that the inert particles disrupt the closed polymeric structure of the plastic material allowing migration of the sanitizing combination to the surface of the plastic article.

In producing the self-sanitizing plastic the procedure normally employed is used with addition of the sanitizing additive (either singly or pre-mixed with or without the inert particulate) any time prior to molding. All that is necessary is that an essentially homogeneous mixture for uniform dispersion of the sanitizing additive is prepared prior to molding.

One convenient way to form the self-sanitizing plastic is to use commercially available pelletized plastic (say pellets of 1/16 to ⅛ inch diameter).

After an appropriate amount of sanitizing additive is mixed with and coated on a sufficient quantity of pelletized plastic material, the mixture is charged to a hopper of a conventional melt extruder where the mixture is melted and the sanitizing additive is homogeneously distributed throughout the melted mass by the action of the extruder. The resultant molten mass of plastic material may be formed into a desirable shape such as disclosed previously. The molten mass may be formed into a sheet of plastic film and when such is done the sheet is even in texture, translucent and contains a uniform dispersion of the additive.

Of course, the inert particulate may be added along with the sanitizing combination.

It has also been found that the molten mass from the melt extruder may be passed through a conventional spineret to generate thermoplastic fibers containing the sanitizing additive. These fibers may be gathered together to form conventional threads and yarns for numerous uses.

The temperature employed during plastic melting will be that normally employed in the same process for the same plastic material, say 250° to 400° F., as a generalization.

In the following examples, the procedure set forth directly below was used to form the self-sanitizing plastic and to test the same.

Step 1:
Accurately measuring by weight in grams, for example on an O'Haus triple beam scale, the amounts of boric acid and alum, and optionally, inert particulate.

Step 2:
Blending the above ingredients in a receptacle.

Step 3:
The dry mix of Step 2 is then introduced into one hundred parts of base resin such as polyethylene, polystyrene, or others in the percentage desired, again by dry blending.

Step 4 - Optional:
A color concentrate pellet in concentrate form (pigmented pellet) of any base color or shade combination desired is introduced into the above mixture in a one to fifty let down (one part pellet/base resin) or any other amount as deemed necessary to attain depth of color or shade for the finished product.

Step 5:
Into the above mixture of chemicals, plastic resin and pigments a suitable percentage of mixing assistant such as mineral oil, one part per hundred or more as desired, but not to exceed a needed amount to make all parts adhere to each other, is added and stirred in to blend all materials as uniformly as is possible prior to a tumbling mixing operation. A few drops of industrial perfume, such as that supplied to the plastic industry, can be added as a masking device, where plastics such as polyvinyl chloride and others may present a strange or undesirable odor in the finished product.

Step 6:
The whole of the above is then placed in a cylinder with a wide mouth and cap for a thorough mixing operation. A tumble mixer or the like is then put into motion after receiving the cylinder mentioned above and rotated for forty minutes or more as desired for a total admixture of all parts.

Step 7:
The mixture is then removed from the cylinder in which it was tumble mixed.

Step 8:
A portion of the above mixture is then introduced into the hopper or barrel of an extruder, which can be set at an appropriate temperature for any one of many base resins. A temperature range of 250° to 400° F., seems best suited for molding products.

Samples of molded plastic taken from the above bench or production sequence are then tested for the self-sanitizing efficacy against certain pathogenic cultures such as staphylococcus aureus, bacillus subtilis, echerichia coli, klebsiella pneumoniae, enterobacter aerogenes, etc.

A disc or rectangular piece of the above plastic is exposed to the cultures mentioned above and others in the following manner:

Taking the conventional nutrient agar plate in one hand with the cover removed, and a wire loop in the other hand, an even streak is made in four directions innoculating the entire surface of the agar coating, the wire loop having been inserted into a slant culture tube which is withdrawn after picking up the desired culture for testing. After streaking the plates, the sample of plastic to be tested is then placed carefully in the center of the agar dish, using forces or tongs. The cover is then placed on the plate; the dish is inverted and then placed in an incubation oven at the usual temperature to accelerate growth of the organism (culture). After 12 to 24 hours the plate is then removed from the oven and observations are made for the purpose of tabulating the possible kill or halo (zone of inhibition) surrounding the plastic. A measurement is made in millimeters from representative locations around the plastic to the outer periphery of the halo.

In the following examples, the petri dishes measured 100 millimeters in diameter by 10 millimeters depth and plastic discs measuring 1.25 inches in diameter were used.

EXAMPLE 1.

Using the above procedure, various concentrations of boric acid and ammonium alum, separately and in combination, were tested as to antiseptic effect against the listed organisms in polyethylene. A pigment was present in 2 parts per hundred parts of polyethylene where the test plastic is indicated to have been pigmented.

TABLE I.

| Test Designation: | A-1 | B-1 | C-1 | E-2 | S-1 | D-1 | I-1 |
|---|---|---|---|---|---|---|---|
| CULTURE | | | | | | | |
| 1. Bacillus Subtilis | 5 | | 5 | 1–3 | 0 | 5–2 | 0 |
| 2. Candida Albicans | | | | 3 | 0 | 14 | 4–10 |
| 3. Escherichia Coli | 1–6 | 6–8 | 1–5 | 4 | 0 | 2–3 | 1–2 |
| 4. Escherichia Coli Acidilactici | 0 | | 2–5 | | | | |
| 5. Klebsiella pneumoniae | 4 | 6–7 | 6 | 3–5 | 0 | 12–20 | 0–6 |
| 6. Proteus Vulgaris | | | | | | | |
| 7. Pseudomonas aeruginosa | | | | | | 1–3 | 0 |
| 8. Sarcina luteau | | | | | | | |
| 9. Salmonella enteritidis | | | | | | | |
| 10. Salmonella paratyphi | 3–5 | 4–10 | 5 | | | | |
| 11. Salmonella schottinuelleriae | | | | | | | |
| 12. Shigella dysenteri | 1–4 | 2–7 | 6 | | | | |
| 13. Shigella sonnei | | | | | | | |
| 14. Staphylococc | 4 | 20 | 6 | 3–4 | 0 | | |
| 15. Streptococcus faecalis | | | | | | 0–20 | 2–4 |
| 16. Streptococcus faecalis mitis | | | | 2–4 | 0 | | |
| 17. Enterobacter aerogenes | 2 | | 6 | | | 7 | 0 |
| 18. Erwinia carotorora | 2–5 | 3–18 | 3 | | | | |
| 19. Penicillium expansum | 0 | 6–12 | 2–8 | | | | |
| 20. Saprolegnia | 0 | 2–20 | 2–18 | | | | |

| Test Designation: | J-1 | W-1 | Y-1 | Y-2 | Z-1 | Z-2 |
|---|---|---|---|---|---|---|
| CULTURE | | | | | | |
| 1. Bacillus Subtilis | 1-6 | 0 | 4–5 | 2 | | |

TABLE I.-continued

| | | | | | | |
|---|---|---|---|---|---|---|
| 2. Candida Albicans | 1-3-6 | 0 | | | 3-13 | 0 |
| 3. Escherichia Coli | 2-3 | 0 | | | 2-3 | 0 |
| 4. Escherichia Coli Acidilactici | 2-7 | 0 | | | 3 | |
| 5. Klebsiella pneumoniae | 3-4 | 0 | | | 1-4-13 | 0 |
| 6. Proteus Vulgaris | 6-9 | 0 | 4-6 | 3-4 | | |
| 7. Pseudomonas aeruginosa | 1-2 | 0 | | | | |
| 8. Sarcina luteau | | | 5-10 | 6 | | |
| 9. Salmonella enteritidis | 1-4 | 0 | 3 | 0 | | |
| 10. Salmonella paratyphi | | | 4 | 0 | | |
| 11. Salmonella schottmuelleriae | | | 5 | 3 | | |
| 12. Shigella dysenteri | | | 10-13 | 0 | | |
| 13. Shigella sonnei | | | 2 | 0 | | |
| 14. Staphylococc | | | | | 10 | 0 |
| 15. Streptococcus faecalis | 2-15 | 0 | | | | |
| 16. Streptococcus faecalis mitis | | | | | | |
| 17. Enterobacter aerogenes | | | | | | |
| 18. Erwinia carotorora | | | | | | |
| 19. Penicillium expansum | 4-11 | 0 | | | 1-10 | 1-10 |
| 20. Saprolegnia | | | | | | |

TABLE II.

| | | | | | |
|---|---|---|---|---|---|
| A-1 | Pigmented | 5% | boric acid | | |
| B-1 | " | 5% | " | 1½% | alum |
| C-1 | " | — | " | 4½% | " |
| E-2 | " | — | " | 5% | " |
| S-1 | Not pigmented | — | " | 6% | " |
| D-1 | Pigmented | 1½% | " | 4½% | " |
| I-1 | Not pigmented | " | " | " | " |
| J-1 | Pigmented | 2½% | " | 2½% | " |
| W-1 | Not pigmented | 2½% | " | 2½% | " |
| Y-1 | Pigmented | 4½% | " | 4½% | " |
| Y-2 | Not pigmented | 4½% | " | 4½% | " |
| Z-1 | Pigmented | 4½% | " | 2% | " |
| Z-2 | Not pigmented | 4½% | " | 2% | " |

The numerical designations in Table II represent the width of the halo of inhibition surrounding the plastic disc in millimeters (the segment of a line drawn through the center of the disc through the halo of inhibition from the edge of the disc to the perimeter of the zone of inhibition).

Where more than one numeral appears per test, the halo of inhibition was not of uniform width throughout its circumference and the numerical values represent the narrowest and widest portions of the halo. At times, an intermediate measurement was also taken.

EXAMPLE 2.

The results tabulated in Table III were obtained in the same manner as in Example I.

TABLE III.

| Test Designation: | A-1 | B-1 | C-1 | D-1 | I-1 | J-1 | L-1 | S-1 |
|---|---|---|---|---|---|---|---|---|
| CULTURE | | | | | | | | |
| 1. Bacillus Subtilis | | | 0-5 | 5-12 | | | | 0 |
| 2. Candida Albicans | | | 12-20 | 14 | 4-10 | | 0-2 | 0 |
| 3. Escherichia Coli | | 2-5-7 | 1-4 | 2-3 | 1-2 | | 3-7 | 0 |
| 4. Escherichia Coli Acidilactici | 0 | 2-3 | 2-5 | | | 6-8 | | |
| 5. Klebsiella pneumoniae | | 6-7 | 5-6 | 12-20 | 0-6 | 3-10 | 0-4 | 0 |
| 6. Proteus Vulgaris | | | 2-0 | | | | | |
| 7. Pseudomonas Aeruginosa | | | 4-5 | 1-3 | | | | |
| 8. Sarcina Luteau | | | 0-20 | | | | | |
| 9. salmonella enteritidis | | 2-7 | 0-3 | | | | | |
| 10. Salmonella paratyphi | 2-5 | 4-10 | 0-6 | | | | | |
| 11. Salmonella schottmuelleriae | | | 2-4 | | | | | |
| 12. Shigella Dysenteri | | 2-7 | 1-6 | | | | | |
| 13. Shigella Sonnei | | 4-10 | 0-20 | | | | | |
| 14. Staphylococcus Aureus | 0-4 | | 1-5 | 0-20 | 2-4 | 12-15 | 0-6 | 0 |
| 15. Enterobacter Aerogenes | | | 6 | 7 | 0 | | | 0 |
| 16. Erwinia Carotorora | 0-5 | 2-17 | 0-2 | 0 | | 4-11 | | |
| 17. Penicillium Expansum | 0 | 6-12 | 2-8 | | | | | |
| 18. Saprolegnia | | 0-10 | 0-18 | 10-22 | | 4-20 | | |
| 19. Aspergillus Niger | | | * | | | | | |
| 20. Trichophyton Mentagrophytes | | | | | | | | |

| Test Designation. | W-1 | X-1 | Y-1 | Z-1 | E-2 | F-2 | G-2 |
|---|---|---|---|---|---|---|---|
| CULTURE | | | | | | | |
| 1. Bacillus Subtilis | | | 1-2-4-5 | 2-6 | 1-3 | 4-6 | 1-6 |
| 2. Candida Albicans | | 1-4 | | 3-13 | 0-2 | | 3-10 |
| 3. Escherichia Coli | | 0 | | 0-1-3 | 1-4 | | 0-3 |
| 4. Escherichia Coli Acidilactici | 0 | | | | | | 1-11 |
| 5. Klebsiella pneumoniae | 0 | 0-4 | | 2-4-13 | 3-5 | | |
| 6. Proteus Vulgaris | | | 2-3-4-6 | | | | |
| 7. Pseudomonas Aeruginosa | | | | | | 5-13 | 5-20 |
| 8. Sarcina Luteau | | | 0-10 | | | | |
| 9. Salmonella enteritidis | | 0.2 | 0-2 | | | | 1-3 |
| 10. Salmonella paratyphi | | | 0-1-2-3 | | | | |
| 11. Salmonella schottmuelleriae | | | 0-4 | | | | 3-18 |
| 12. Shigella Dysenteri | | | 10-13 | | | | |
| 13. Shigella Sonnei | | | 0-1 | | | | |
| 14. Staphylococcus Aureus | 0 | 0 | | 10 | 3-4 | | |
| 15. Enterobacter Aerogenes | | | | | 1-2-4 | 1-3 | 2-17 |
| 16. Erwinia Carotorora | | 0 | | | | 1-4 | |
| 17. Penicillium Expansum | | | | 1-10 | | 4-10 | 0-6 |
| 18. Saprolegnia | 0 | | | | | | 20 |
| 19. Aspergillis Niger | | | | | | | |
| 20. Trichophyton Mentagrophytes | | | | | 2-3 | | |

*Completely

TABLE IV.

The test designations have the same meaning as in Table II, with the following additions:

| L-1 | Not pigmented | 3½% | Boric acid | 4½% | alum |
|-----|---------------|-----|------------|-----|------|
| F-2 | Pigmented | 5% | " | 4½% | " |
| G-2 | " | 5% | " | 4½% | " |

The results tabulated in Example 2 were not all obtained at nearly the same time (as compared to Example 1, where this was the case) and did not involve, in many instances, homogeneous mixing. However, this example does support the invention of this application.

Variations of the invention will be apparent to those skilled in the art.

What is claimed is:

1. A self-sanitizing plastic article consisting essentially of a moldable polyethylene resin and uniformly dispersed therethrough about 0.5 to 10 percent by weight of boric acid, about 0.5 to 10 percent by weight potassium or ammonium alum and about 0.5 to 3 percent by weight of a finely-divided inert particulate.

2. The article of claim 1 containing about 2 to 5 percent boric acid and about 2 to 5 percent alum.

3. The article of claim 2 containing about 2½ to 4 percent boric acid and about 2½ to 4 percent alum.

4. The article of claim 3 containing about 2 percent of said particulate.

5. A self-sanitizing plastic article consisting essentially of a moldable polyethylene resin and uniformly dispersed therethrough about 0.5 to 10 percent by weight of boric acid, about 0.5 to 10 percent by weight potassium or ammonium alum and about 0.5 to 3 percent by weight of a finely-divided particulate pigment.

6. The article of claim 5 containing about 2 to 5 percent boric acid and about 2 to 5 percent alum.

7. The article of claim 6 containing about 2½ to 4 percent boric acid and about 2½ to 4 percent alum.

8. The article of claim 7 containing about 2 percent of said particulate pigment.

* * * * *